United States Patent [19]
Hawkins et al.

[11] 3,853,253
[45] Dec. 10, 1974

[54] BAG CARRIER FOR BICYCLES

[75] Inventors: Howard C. Hawkins; Arthur B. Engstrom, both of St. Paul, Minn.

[73] Assignee: Hazel Park Schwinn Cycle Center, Inc., St. Paul, Minn.

[22] Filed: Nov. 16, 1972

[21] Appl. No.: 307,126

[52] U.S. Cl................................224/39, 224/41
[51] Int. Cl............................................ B62j 7/04
[58] Field of Search.................. 224/39 R, 41, 30 R

[56] References Cited
UNITED STATES PATENTS
551,068  12/1895  Wilson.............................. 224/41 X
582,173  5/1897  Buckley............................. 224/39 R FOREIGN PATENTS OR APPLICATIONS
13,654  7/1899  Great Britain.................... 224/39 R
765,862  1/1957  Great Britain.................... 224/39 R Primary Examiner—Robert J. Spar
Assistant Examiner—Jerold M. Forsberg
Attorney, Agent, or Firm—H. Dale Palmatier; James R. Haller

[57] ABSTRACT

Apparatus attachable to a bicycle or similar frame member for carrying articles, wherein the apparatus is clamped to the frame member by a first pair of semi-circular members for grasping the frame member in a first direction and a second pair of semi-circular members for grasping the frame member in a second and opposing direction.

2 Claims, 7 Drawing Figures

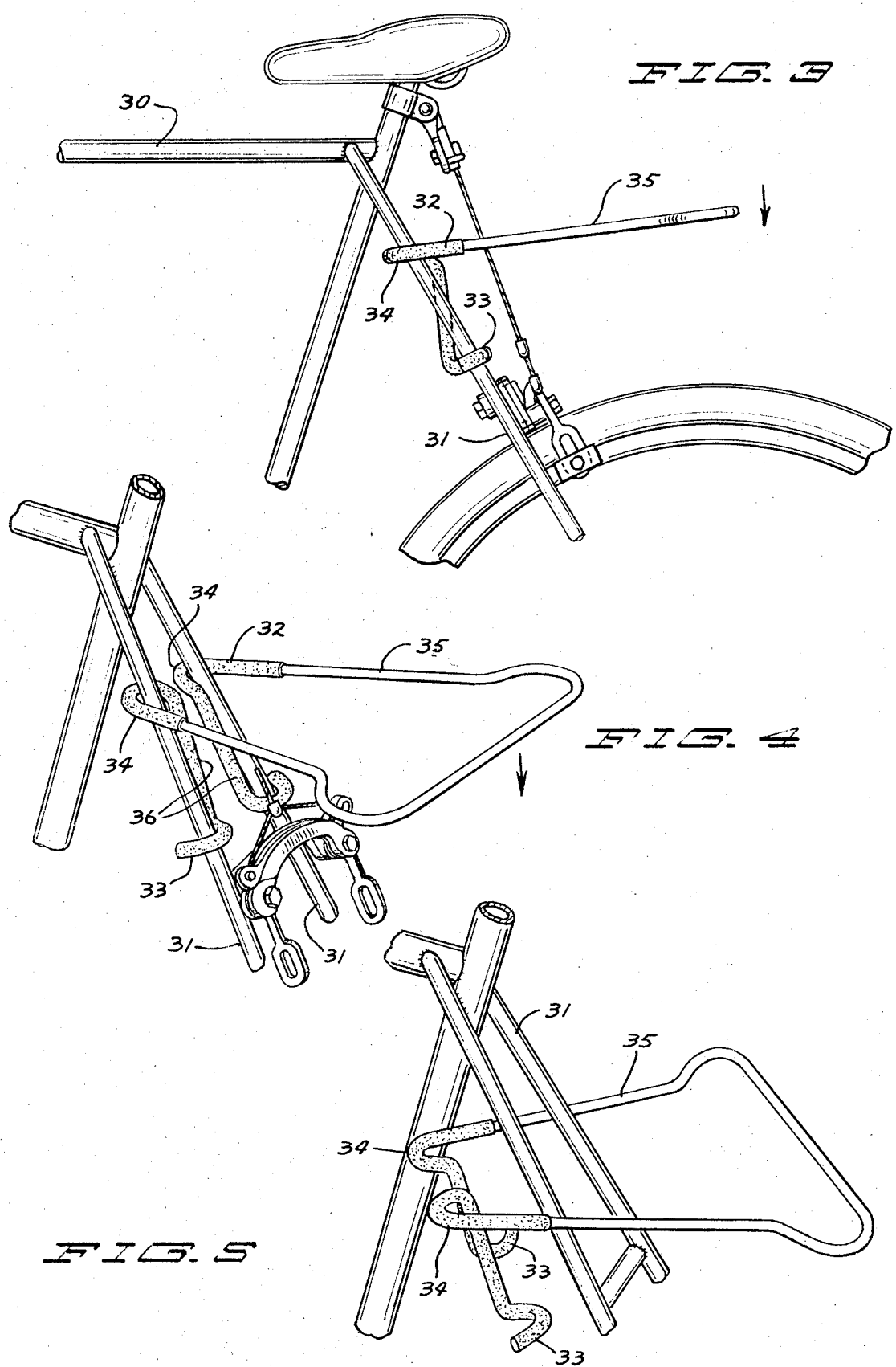

BAG CARRIER FOR BICYCLES

This invention relates to parcel and luggage carrier for attaching to a bicycle or other similar machine having frame members of the same general construction as a bicycle. The invention has the advantage of being simple in construction and extremely easy to mount or attach to a bicycle frame member. It requires no special mounting procedure or tools and does not injure or mar the finish of the frame member against which it is attached. A further advantage of the invention is that it can be attached to a frame member in seconds, and yet provides a stable and secure support means for attachment of parcels or other articles.

Briefly, the invention comprises a length of heavy wire bent and shaped in a novel fashion to provide a supporting and clamping means for attaching to a bicycle frame or handle bar member. One embodiment of the invention is shaped and adapted for mounting over the front bicycle handle bars, and a second embodiment of the invention is shaped and adapted for attachment to the rear bicycle frame member. In the second embodiment the invention is shaped to have a first pair of semi-circular clamping members for grasping the frame member in a first direction, and a second pair of semi-circular clamping members for grasping the frame member in a second, opposing, direction. Once installed on a bicycle frame, the invention becomes more securely fastened to the frame with loading of parcels and other objects on the invention. Further, the construction of the invention is of heavy wire having spring-like characteristics, which construction serves to cushion articles carried by the invention and to absorb shock caused by road surfaces and bumps.

These advantages, as well as other features and advantages of this invention will become apparent from the following detailed description, with reference to the accompanying drawings which form a part hereof.

FIG. 3 illustrates a portion of a rear section of a bicycle frame, showing a second embodiment of the invention attached thereto;

FIG. 4 is a side perspective view of FIG. 3, showing in more detail the position of the invention;

FIG. 5 is a view of the same bicycle section as FIG. 4, showing installation of the invention;

Figure 1:
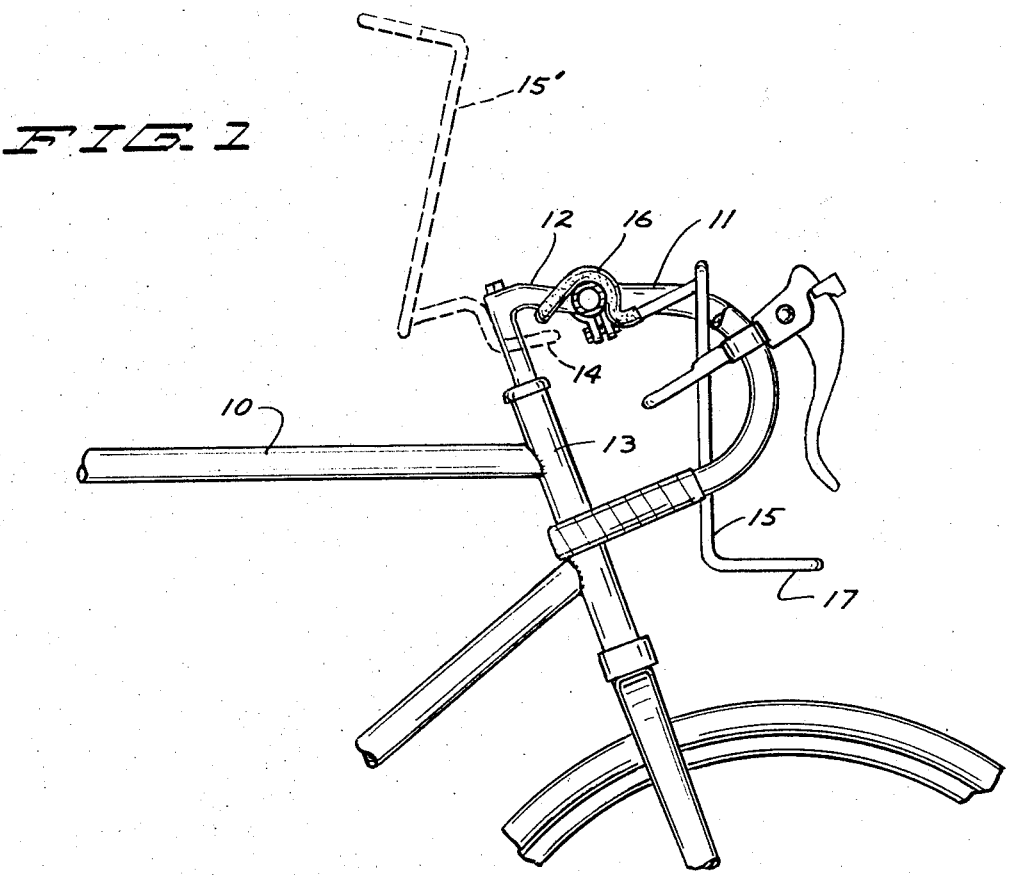
FIG. 1 is a side view of a front section of a bicycle frame showing an embodiment of the invention installed thereon.

Referring first to FIG. 1, a front frame section 10 is illustrated. A handle bar 11 is shown attached to bracket 12, which in turn is connected to the front bicycle fork 13. An embodiment of the invention is shown at 15 in its installed position. The same embodiment is also shown at 15' in a position during installation. The installation procedure can be understood clearly with reference to the two positions shown in FIG. 1, together with the perspective view of the invention illustrated in FIG. 2. The invention is installed by bringing support 15 up and around handle bar bracket 12 so that loop 14 rests under the bracket 12 in a supportive manner. The curved portion 16 engages against the handle bar 11 to provide a second supportive function, which is all that is required to completely support the invention. To avoid scratching or damage to frame members and handle bars, the portions 14 and 16 of the invention which bear upon these members are covered with a plastic or rubber material to protect these members.

Figure 2:
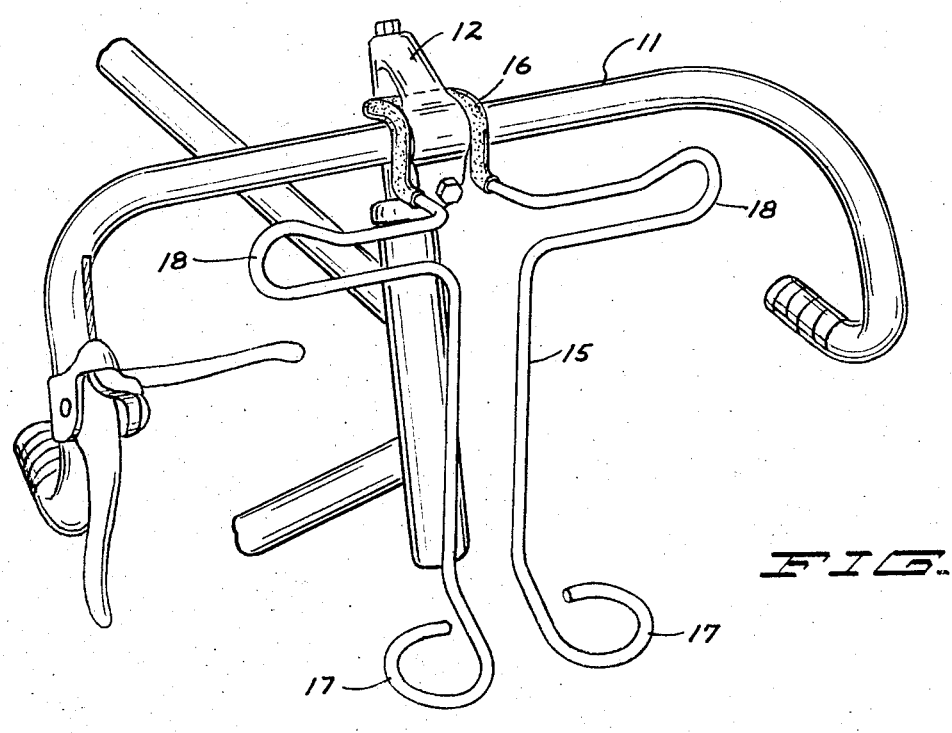
FIG. 2 is a side perspective view of the frame of FIG. 1 showing the relationship of the invention to the frame member.

The support 15 is shaped in a manner convenient for the carrying and supporting of bags, articles, luggage, etc. For example, a pair of perpendicular extensions 17 are illustrated in FIG. 2 for holding the weight of articles, and FIG. 2 also illustrates a pair of support arms 18 against which articles may be fastened. It is to be emphasized that extensions 17 and support arms 18 may be made of any convenient size or shape, depending upon the nature of articles to be carried by the invention. The embodiment illustrated in FIG. 2 has been found to be of a shape convenient for general carrying purposes.

FIG. 3 illustrates a rear bicycle section 30 having two frame sections 31 extending downwardly for attaching the bicycle wheel. A second embodiment of the invention is shown as support 35, again constructed of heavy wire preferably. From the side view of support 35 it is apparent that support 35 bears against frame section 31 at bend 34, and also at bend 33. This bearing or loading force relationship can be also be seen in the perspective view of FIG. 4. The portion of support 35 which is exposed to frame section 31 is preferably covered with a plastic or rubber material to avoid damage to the frame section. This protective covering 32 is shown both in FIG. 3 and FIG. 4.

The shaping of support 35 can best be described with reference to FIG. 4. It is apparent that bends 33 are shaped to grasp frame section 31 in a sense and direction opposite to bends 34. By construction of bends 33 and 34 in this relative manner, the support 35 becomes more securely attached to frame members 31 as load is applied in the direction indicated by the downward arrow. A downward force causes the inner surfaces of bends 33 and 34 to grasp frame section 31 more tightly; bends 34 tend to become more tightly gripped around frame section 31 and part of this gripping force is transferred to bends 33 via spacer sections 36. The force on bends 34 is opposed by an opposite force on bends 33, both of which act to support the load carried by support 35.

The horizontal extensions of support 35 may be shaped in any manner convenient for the carrying of parcels, etc. FIG. 4 illustrates a loop projecting outwardly from frame sections 31 a distance of approximately 12–18 inches. This shape and dimension is an optional selection depending upon the nature of the objects to be carried. The distance between bends 34 and bends 33 is determined by the spacer sections 36, which length is optional and dependent largely upon the relative dimensions of frame sections 31. A typical embodiment as illustrated in FIG. 4 has spacer sections 36 of approximately 4 inches in length.

Figure 6:
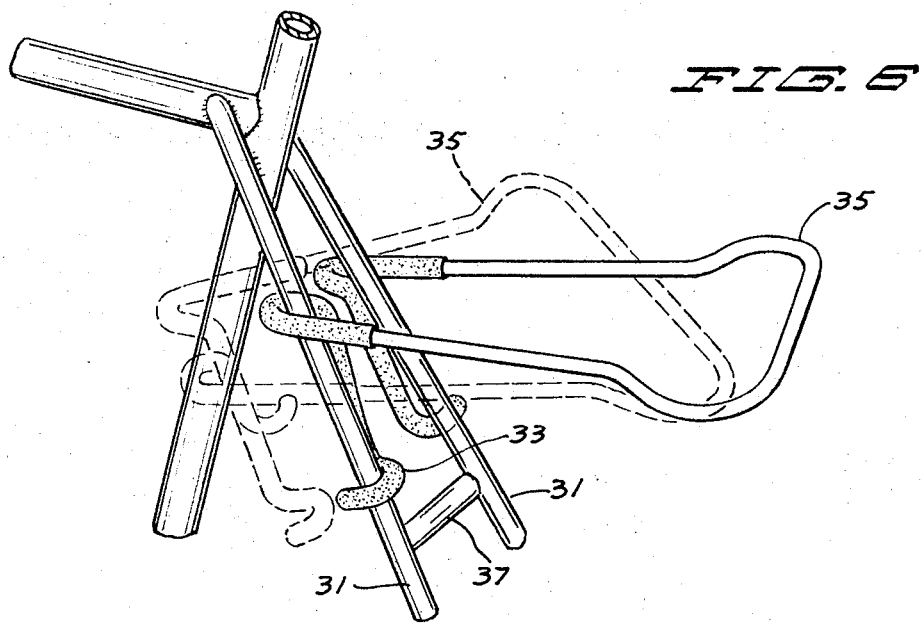
FIG. 6 is a further showing of the installation of the invention.

Referring now to FIG. 5, support 35 is shown in partial attachment to frame sections 31. This figure illustrates the first step of the mounting procedure, which involves sliding the open end of support 35 over frame sections 31 so that frame sections 31 fit within the open end of support 35. Once support 35 has been moved into the position shown in FIG. 5 it can then be positioned as shown in FIG. 4 wherein the respective bends 34 and 33 are looped around portions of frame sections 31. FIG. 6 illustrates this two-step procedure, wherein the dotted lines show support 35 in the position of FIG. 5 and the solid lines indicate the final position of support 35. When support 35 has been positioned against frame sections 31, the last step necessary to complete installation is to slide support 35 downwardly so that the bottom edges of bends 33 rest against the top surface of cross bar 37. This gives stability in the vertical direction and prevents sliding along frame sections 31.

Figure 7:
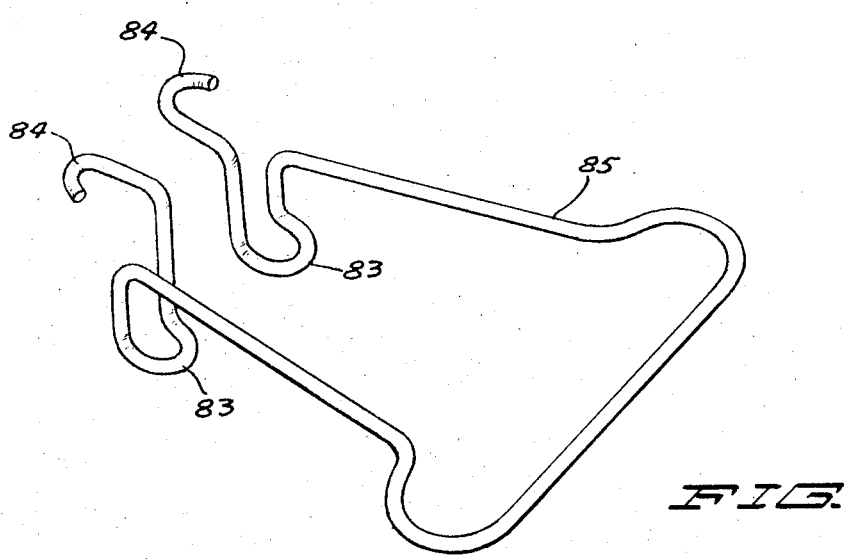
FIG. 7 shows an embodiment of a rear-mounting support which differs from those previously shown.

FIG. 7 illustrates yet another embodiment of the rear support. Support 85 is shown in yet another adaptation and shape, again selected for convenience in carrying articles. Bends 83 and 84 are again designed to grasp around a frame section as hereinbefore explained, and the horizontal extension of support 85 projects outwardly from a point midway between bends 84 and 83 instead of from either pair of bends.

Other embodiments of the invention can be shown further illustrating the invention, and the scope thereof is shown in the following appended claims.

What is claimed is:

1. A carrying apparatus for quick and easy attachment to and detachment from the rigid uprights of the rear fork of a bicycle frame and above the crossbar which interconnects the uprights, comprising a single length of semirigid wire having a middle portion defining a rearwardly extending, substantially horizontal load-carrying loop and the semirigid wire also having forward end portions defining attachment legs for securing to the fork uprights, each leg being free of the other leg and having spaced upper and lower substantially semicicular and oppositely oriented load-carrying bends to lie against and receive a respective fork upright therein, the lower bend bearing forwardly against the rear face of the fork upright and downwardly on the crossbar, and the upper load-carrying bend bearing rearwardly against the forward face of the fork upright and preventing downward tipping of the horizontal loop, each leg also having an upright spacer section extending between the upper and lower bends and extending along and in closely spaced relation to the spacer section of the other leg to lie between the fork uprights and to bear outwardly against the respective fork uprights in a direction transversely of the bicycle frame, and the upper and lower extremities of the legs adjacent the bends facing inwardly in confronting relation with the spacer sections to bear inwardly against the fork upright in a direction transversely of the bicycle frame, the upper extremities of the legs extending substantially horizontally rearwardly to the load-carrying loop and extending forwardly and thence transversely inwardly toward each other and into said upper bends to bear rearwardly against and to embrace and confine the uprights of the rear fork and position the load-carrying loop well above the lower bends of the legs which bear downwardly on the fork crossbar.

2. The carrying apparatus of claim 1 wherein the upper and lower load-carrying bends lie respectively in substantially horizontal, vertically spaced planes, the upper bend being substantially co-planar with the load-carrying loop.

* * * * *